US010289080B2

(12) United States Patent
Taimela et al.

(10) Patent No.: US 10,289,080 B2
(45) Date of Patent: May 14, 2019

(54) MULTI-GENERATOR APPLICATIONS USING VARIABLE SPEED AND SOLID STATE GENERATORS FOR EFFICIENCY AND FREQUENCY STABILIZATION

(71) Applicant: FLEXGEN POWER SYSTEMS, INC., Houston, TX (US)

(72) Inventors: Pasi Taimela, Wake Forest, NC (US); Tony Olivo, Raleigh, NC (US); Robert William Johnson, Jr., Raleigh, NC (US)

(73) Assignee: Flexgen Power Systems, Inc., Durham, NC (US)

(*) Notice: Subject to any disclaimer, the term of this patent is extended or adjusted under 35 U.S.C. 154(b) by 798 days.

(21) Appl. No.: 14/258,649

(22) Filed: Apr. 22, 2014

(65) Prior Publication Data
US 2014/0316593 A1 Oct. 23, 2014

Related U.S. Application Data

(63) Continuation-in-part of application No. 13/875,603, filed on May 2, 2013, now Pat. No. 9,312,699.
(Continued)

(51) Int. Cl.
G05B 15/02 (2006.01)
H02J 3/24 (2006.01)
(Continued)

(52) U.S. Cl.
CPC ............... *G05B 15/02* (2013.01); *H02J 3/24* (2013.01); *H02J 3/28* (2013.01); *H02J 3/381* (2013.01);
(Continued)

(58) Field of Classification Search
CPC ...... H02J 3/24; H02J 3/28; H02J 3/381; H02J 3/30
(Continued)

(56) References Cited

U.S. PATENT DOCUMENTS 4,992,920 A 2/1991 Davis
5,563,802 A * 10/1996 Plahn .................... H02J 9/062
290/1 R
(Continued)

FOREIGN PATENT DOCUMENTS

DE 69 707 704 D1 11/2001
DE 69 707 704 T2 6/2002
(Continued)

OTHER PUBLICATIONS

U.S. Appl. No. 61/771,403 entitled "*Hybrid Energy Storage System and Methods*", filed Mar. 1, 2013.
(Continued)

*Primary Examiner* — Alfonso Perez Borroto
(74) *Attorney, Agent, or Firm* — Stanek Lemon Crouse & Meeks

(57) ABSTRACT

A system includes at least one variable speed generator system configured to provide power to a load bus and at least one fixed speed generator configured to provide power to the load bus. The system also includes a solid state generator (SSG) system including at least one energy storage device and a converter coupled to the at least one energy storage device and configured to transfer power between the at least one energy storage device and the load bus. The system further includes a control system configured to control the at least one variable speed generator system, the at least one fixed speed generator and the SSG system responsive to changes in a load on the load bus.

22 Claims, 5 Drawing Sheets

Related U.S. Application Data

(60) Provisional application No. 61/814,987, filed on Apr. 23, 2013, provisional application No. 61/771,417, filed on Mar. 1, 2013, provisional application No. 61/712,533, filed on Oct. 11, 2012.

(51) Int. Cl.
*H02J 3/28* (2006.01)
*H02J 3/38* (2006.01)
*H02J 3/30* (2006.01)
*H02J 3/32* (2006.01)

(52) U.S. Cl.
CPC . *H02J 3/30* (2013.01); *H02J 3/32* (2013.01); *Y02E 40/10* (2013.01); *Y10T 307/516* (2015.04)

(58) Field of Classification Search
USPC .......................................................... 307/66
See application file for complete search history.

(56) References Cited

U.S. PATENT DOCUMENTS

| | | | |
|---|---|---|---|
| 5,907,192 A | 5/1999 | Lyons et al. | |
| 5,929,538 A | 7/1999 | O'Sullivan et al. | |
| 6,038,118 A | 3/2000 | Guerra | |
| 6,104,102 A | 8/2000 | Tsuji et al. | |
| 6,128,204 A | 10/2000 | Munro et al. | |
| 6,175,217 B1 | 1/2001 | Da Ponte et al. | |
| 6,252,753 B1 | 6/2001 | Bhargava | |
| 6,870,279 B2 | 3/2005 | Gilbreth et al. | |
| 6,879,053 B1 | 4/2005 | Weiches et al. | |
| 6,958,550 B2 | 10/2005 | Gilbreth et al. | |
| 6,969,922 B2 | 11/2005 | Welches et al. | |
| 7,002,260 B2 | 2/2006 | Stahlkopf | |
| 7,116,010 B2 | 10/2006 | Lasseter et al. | |
| 7,184,903 B1 | 2/2007 | Williams et al. | |
| 7,391,126 B2 | 6/2008 | Liu et al. | |
| 7,474,016 B2 | 1/2009 | Wang et al. | |
| 7,476,987 B2 | 1/2009 | Chang | |
| 7,514,808 B2 | 4/2009 | Wobben | |
| 7,560,906 B2 | 7/2009 | Liu et al. | |
| 7,612,466 B2 | 11/2009 | Skutt | |
| 7,675,187 B2 | 3/2010 | Woods et al. | |
| 7,680,562 B2 | 3/2010 | Delmerico et al. | |
| 7,701,087 B2 | 4/2010 | Eckroad et al. | |
| 7,781,902 B2 | 8/2010 | Cerney et al. | |
| 7,787,272 B2 | 8/2010 | Lasseter et al. | |
| 7,834,479 B2 | 11/2010 | Capp et al. | |
| 7,855,467 B2 | 12/2010 | Kawazoe et al. | |
| 7,906,862 B2 | 3/2011 | Donnelly et al. | |
| 7,969,030 B2 | 6/2011 | Woods et al. | |
| 8,022,572 B2 | 9/2011 | Vyas et al. | |
| 8,080,898 B2 | 12/2011 | Fukuhara | |
| 8,099,198 B2 | 1/2012 | Gurin | |
| 8,164,217 B1 | 4/2012 | Miller | |
| 8,222,756 B2 | 7/2012 | Koeneman et al. | |
| 8,227,929 B2 | 7/2012 | Burra et al. | |
| 8,315,745 B2 | 11/2012 | Creed | |
| 8,338,987 B2 | 12/2012 | O'Brien et al. | |
| 8,452,688 B1 | 5/2013 | Sharplin et al. | |
| 8,492,913 B2 | 7/2013 | Koeneman et al. | |
| 8,532,834 B2 | 9/2013 | Delong et al. | |
| 8,558,510 B2 | 10/2013 | Moon | |
| 8,688,281 B2 | 4/2014 | Viassolo et al. | |
| 8,751,036 B2 | 6/2014 | Darden, II et al. | |
| 8,766,474 B2 | 7/2014 | Carralero et al. | |
| 8,810,066 B2 | 8/2014 | Moon | |
| 8,829,698 B2 | 9/2014 | Koeneman et al. | |
| 8,831,788 B2 | 9/2014 | Flynn et al. | |
| 8,849,469 B2 | 9/2014 | Belady et al. | |
| 8,866,334 B2 | 10/2014 | Donnelly et al. | |
| 8,922,056 B2 | 12/2014 | Thisted | |
| 8,922,062 B2 | 12/2014 | Johnson et al. | |
| 8,938,323 B2 | 1/2015 | Lee | |
| 8,946,916 B2 | 2/2015 | Tarnowski | |
| 8,946,929 B2 | 2/2015 | Singh et al. | |
| 8,975,767 B2 | 3/2015 | Algrain | |
| 9,026,259 B2 | 5/2015 | Zadeh et al. | |
| 9,026,260 B1 | 5/2015 | Thornley et al. | |
| 9,042,141 B2 | 5/2015 | Yu et al. | |
| 2002/0190525 A1 | 12/2002 | Worden et al. | |
| 2002/0198648 A1 | 12/2002 | Gilbreth et al. | |
| 2003/0047209 A1 | 3/2003 | Yanai et al. | |
| 2004/0051387 A1 | 3/2004 | Lasseter et al. | |
| 2004/0084965 A1* | 5/2004 | Welches | H02J 3/01 307/64 |
| 2004/0245783 A1 | 12/2004 | Gilbreth et al. | |
| 2005/0012395 A1 | 1/2005 | Eckroad et al. | |
| 2005/0077881 A1* | 4/2005 | Capp | H02J 3/30 322/29 |
| 2005/0154499 A1 | 7/2005 | Aldridge et al. | |
| 2005/0200133 A1 | 9/2005 | Wobben | |
| 2007/0182158 A1 | 8/2007 | Cerney et al. | |
| 2007/0228836 A1 | 10/2007 | Teichmann | |
| 2007/0267871 A1 | 11/2007 | Gregory | |
| 2008/0088183 A1 | 4/2008 | Eckroad et al. | |
| 2008/0203734 A1 | 8/2008 | Grimes et al. | |
| 2008/0211230 A1 | 9/2008 | Gurin | |
| 2008/0278000 A1 | 11/2008 | Capp et al. | |
| 2009/0086520 A1 | 4/2009 | Nishimura | |
| 2009/0140576 A1 | 6/2009 | Yu et al. | |
| 2009/0189456 A1 | 7/2009 | Skutt | |
| 2009/0195074 A1 | 8/2009 | Buiel | |
| 2009/0312885 A1 | 12/2009 | Buiel | |
| 2010/0008119 A1 | 1/2010 | O'Brien et al. | |
| 2010/0138066 A1 | 6/2010 | Kong | |
| 2010/0264739 A1 | 10/2010 | Errington | |
| 2010/0270864 A1* | 10/2010 | Vyas | H02J 7/35 307/82 |
| 2010/0327800 A1 | 12/2010 | Reineccius | |
| 2011/0060474 A1 | 3/2011 | Schmiegel et al. | |
| 2011/0062708 A1 | 3/2011 | Prochaska et al. | |
| 2011/0068631 A1 | 3/2011 | Roscoe | |
| 2011/0080044 A1 | 4/2011 | Schmiegel | |
| 2011/0115295 A1 | 5/2011 | Moon et al. | |
| 2011/0118894 A1 | 5/2011 | Reineccius et al. | |
| 2011/0133558 A1 | 6/2011 | Park | |
| 2011/0140520 A1 | 6/2011 | Lee | |
| 2011/0140648 A1 | 6/2011 | Lee | |
| 2011/0144822 A1 | 6/2011 | Choi | |
| 2011/0148195 A1 | 6/2011 | Lee | |
| 2011/0148360 A1 | 6/2011 | Lee | |
| 2011/0204720 A1 | 8/2011 | Ruiz | |
| 2011/0227340 A1 | 9/2011 | Rozman et al. | |
| 2011/0248569 A1 | 10/2011 | Son et al. | |
| 2011/0260546 A1 | 10/2011 | Hashizume et al. | |
| 2011/0273022 A1 | 11/2011 | Dennis et al. | |
| 2011/0309690 A1 | 12/2011 | West | |
| 2012/0029897 A1 | 2/2012 | Cherian et al. | |
| 2012/0033473 A1 | 2/2012 | Scharf | |
| 2012/0046798 A1 | 2/2012 | Orthlieb et al. | |
| 2012/0068540 A1 | 3/2012 | Luo et al. | |
| 2012/0080942 A1 | 4/2012 | Carralero et al. | |
| 2012/0089261 A1 | 4/2012 | Kim | |
| 2012/0143383 A1 | 6/2012 | Cooperrider et al. | |
| 2012/0146412 A1 | 6/2012 | Harrison | |
| 2012/0146423 A1 | 6/2012 | Bodewes et al. | |
| 2012/0147637 A1 | 6/2012 | Petter | |
| 2012/0166013 A1 | 6/2012 | Park et al. | |
| 2012/0215368 A1 | 8/2012 | Sharma | |
| 2012/0239215 A1 | 9/2012 | Timbus et al. | |
| 2012/0267952 A1 | 10/2012 | Ballatine et al. | |
| 2012/0283887 A1 | 11/2012 | Goldsmith et al. | |
| 2012/0283890 A1 | 11/2012 | Fu et al. | |
| 2012/0292992 A1 | 11/2012 | Williams | |
| 2012/0323396 A1 | 12/2012 | Shelton et al. | |
| 2013/0015703 A1 | 1/2013 | Rouse et al. | |
| 2013/0035802 A1 | 2/2013 | Khaitan et al. | |
| 2013/0041516 A1 | 2/2013 | Rockenfeller et al. | |
| 2013/0062953 A1 | 3/2013 | Nurmi et al. | |
| 2013/0088084 A1 | 4/2013 | Szu | |
| 2013/0099581 A1 | 4/2013 | Zhou et al. | |

(56) References Cited

U.S. PATENT DOCUMENTS

| | | |
|---|---|---|
| 2013/0116844 A1 | 5/2013 | McNally et al. |
| 2013/0141956 A1 | 6/2013 | Chiang et al. |
| 2013/0158901 A1 | 6/2013 | Sahinoglu et al. |
| 2013/0166084 A1 | 6/2013 | Sedighy et al. |
| 2013/0169309 A1 | 7/2013 | Bickel |
| 2013/0187454 A1 | 7/2013 | Timbus et al. |
| 2013/0238151 A1 | 9/2013 | Vaum et al. |
| 2013/0241495 A1 | 9/2013 | Min |
| 2013/0285446 A1 | 10/2013 | Chow et al. |
| 2013/0342020 A1 | 12/2013 | Blevins et al. |
| 2014/0025217 A1 | 1/2014 | Jin et al. |
| 2014/0032000 A1 | 1/2014 | Chandrashekhara |
| 2014/0058571 A1 | 2/2014 | Hooshmand et al. |
| 2014/0078625 A1 | 3/2014 | Zheng et al. |
| 2014/0084682 A1 | 3/2014 | Covic et al. |
| 2014/0088778 A1 | 3/2014 | Nguyen |
| 2014/0088781 A1 | 3/2014 | Kearns et al. |
| 2014/0097683 A1 | 4/2014 | Piyabongkarn et al. |
| 2014/0100705 A1 | 4/2014 | Shi et al. |
| 2014/0103655 A1 | 4/2014 | Burra et al. |
| 2014/0103724 A1 | 4/2014 | Wagoner |
| 2014/0103855 A1 | 4/2014 | Wolter |
| 2014/0129042 A1 | 5/2014 | Miner |
| 2014/0148960 A1 | 5/2014 | Bhavaraju et al. |
| 2014/0183949 A1 | 7/2014 | Murano |
| 2014/0188300 A1 | 7/2014 | Nguyen |
| 2014/0191507 A1 | 7/2014 | Holmberg et al. |
| 2014/0200722 A1 | 7/2014 | Bhavaraju |
| 2014/0214223 A1 | 7/2014 | Tsunoda et al. |
| 2014/0217826 A1 | 8/2014 | Oguchi et al. |
| 2014/0225457 A1 | 8/2014 | Elliott, II |
| 2014/0229031 A1 | 8/2014 | Amarin et al. |
| 2014/0249686 A1 | 9/2014 | Brainard et al. |
| 2014/0265596 A1 | 9/2014 | Yuan et al. |
| 2014/0292259 A1 | 10/2014 | Kim et al. |
| 2014/0306533 A1 | 10/2014 | Paquin et al. |
| 2014/0306534 A1 | 10/2014 | Shi et al. |
| 2014/0312882 A1 | 10/2014 | Dong et al. |
| 2014/0324243 A1 | 10/2014 | Markowz et al. |
| 2014/0337002 A1 | 11/2014 | Manto |
| 2014/0375125 A1 | 12/2014 | Ye et al. |
| 2015/0001931 A1 | 1/2015 | Banham-Hall et al. |
| 2015/0008737 A1 | 1/2015 | Mao |
| 2015/0019034 A1 | 1/2015 | Gonatas |
| 2015/0021998 A1 | 1/2015 | Trescases et al. |
| 2015/0032278 A1 | 1/2015 | Bhageria et al. |
| 2015/0039145 A1 | 2/2015 | Yang et al. |
| 2015/0081124 A1 | 3/2015 | Ekanayake et al. |
| 2015/0094871 A1 | 4/2015 | Bhageria et al. |
| 2015/0097437 A1 | 4/2015 | Votoupal et al. |
| 2015/0105931 A1 | 4/2015 | Forbes, Jr. |

FOREIGN PATENT DOCUMENTS

| | | |
|---|---|---|
| DE | 10 2007 005352 A1 | 8/2007 |
| EP | 0 947 042 A1 | 10/1999 |
| EP | 0 947 042 | 10/2001 |
| EP | 2 251 953 A2 | 11/2010 |
| EP | 2 325 970 A2 | 5/2011 |
| EP | 2 330 726 A2 | 6/2011 |
| EP | 2 337 178 A2 | 6/2011 |
| EP | 2 337 184 A2 | 6/2011 |
| EP | 2 339 714 A2 | 6/2011 |
| EP | 2 380 769 A1 | 10/2011 |
| EP | 1 866 717 B1 | 6/2012 |
| GB | 2434928 A | 8/2007 |
| GB | 2434928 B | 4/2010 |
| JP | 2001-507199 A | 5/2001 |
| JP | 2011-109901 A | 6/2011 |
| WO | WO 98/28832 A1 | 7/1998 |
| WO | WO 99/32762 A1 | 7/1999 |
| WO | WO 02/17475 A1 | 2/2002 |
| WO | WO 2004/038892 A2 | 5/2004 |
| WO | WO 2004/054065 A1 | 6/2004 |
| WO | WO 2005/101610 A2 | 10/2005 |
| WO | WO 2006/094128 A2 | 9/2006 |
| WO | WO 2007/018830 A2 | 2/2007 |
| WO | WO 2008/039725 A2 | 4/2008 |
| WO | WO 2008/125696 A2 | 10/2008 |
| WO | WO 2009/144737 A1 | 12/2009 |
| WO | WO 2010/042550 A2 | 4/2010 |
| WO | WO 2011/008505 A2 | 1/2011 |
| WO | WO 2011/008506 A2 | 1/2011 |
| WO | WO 2011/020149 A1 | 2/2011 |
| WO | WO 2011/124657 A1 | 10/2011 |
| WO | WO 2012/015508 A1 | 2/2012 |
| WO | WO 2012/064906 A2 | 5/2012 |

OTHER PUBLICATIONS

U.S. Appl. No. 14/190,398 entitled "*Hybrid Energy Storage System and Method*" filed Feb. 26, 2014.

\* cited by examiner

MULTI-GENERATOR APPLICATIONS USING VARIABLE SPEED AND SOLID STATE GENERATORS FOR EFFICIENCY AND FREQUENCY STABILIZATION

CROSS-REFERENCE TO RELATED APPLICATIONS

This application claims the benefit of U.S. Provisional Patent Application No. 61/814,987, filed Apr. 23, 2013 entitled MULTI-GENERATOR APPLICATIONS USING VARIABLE SPEED AND SOLID STATE GENERATORS FOR EFFICIENCY AND FREQUENCY STABILIZATION, this application is also a continuation-in-part application and claims the benefit of U.S. patent application Ser. No. 13/875,603, filed May 2, 2013 entitled ISLAND GRID POWER SUPPLY APPARATUS AND METHODS USING ENERGY STORAGE FOR TRANSIENT STABILIZATION, claiming the benefit of U.S. Provisional Patent Application No. 61/771,417, filed Mar. 1, 2013 entitled SOLID STATE GENERATOR (SSG) and claiming the benefit of U.S. Provisional Patent Application No. No. 61/712,533, filed Oct. 11, 2012 entitled ISLAND GRID TRANSIENT FREQUENCY STABILIZATION APPARATUS AND METHODS, the disclosure of all aforementioned applications are hereby incorporated herein by reference in their entirety.

BACKGROUND

The inventive subject matter relates to power systems and, more particularly, to island grid power supply systems and methods.

In many industrial applications, the magnitude of the load is greater than the capacity of a single generator. For these applications, multiple generators may be paralleled to match the load requirements and/or to provide redundancy in the event of a generator failure. These generators that are paralleled may be of the same size and type. In some applications, such as in island grid applications, a utility source may not be present to support load transients or stabilize the load voltage and frequency. Therefore, the generators may change frequency and voltage due to a load transient.

Natural gas is becoming a more desirable fuel for power generation than diesel because of lower fuel cost and improved emissions. However, drawbacks of natural gas engine generators sets include a reduced step response capability and poor control performance with light loads. The magnitude of a load step change that can be tolerated by a generator may be dependent on current loading and the degree of change in load. A typical target for frequency accuracy for marine, industrial and residential loads is 5%. If the load requires a 5% frequency regulation, a natural gas engine generator set may be capable of accepting only a 10% load change. In contrast, a diesel engine generator set may accept a 50% load change with the same regulation. Accordingly, natural gas generators may be severely limited in load step capability to maintain a similar output characteristic to that of diesel generators.

In practice, paralleled generators tend to be all the same size, which may create a problem for the operator if the load is time varying. For example, a typical application may have 3 generators supplying the load. When the load is light, the generators may be loaded artificially with resistor banks so the generators have the minimum load required by the manufacturer. Since the generators have a generally poor response time, the artificial load may also be used to get the generator at speed prior to load application. When the load step is applied, the artificial load is turned off. The use of this artificial load allows the generators to maintain acceptable load voltage and frequency for load steps but at a significant cost in fuel consumption. Accordingly, there is a need for improved techniques of operating such systems.

SUMMARY

According to some embodiments, a system includes at least one variable speed generator system configured to provide power to a load bus and at least one fixed speed generator configured to provide power to the load bus. The system also includes a solid state generator (SSG) system including at least one energy storage device and a converter coupled to the at least one energy storage device and configured to transfer power between the at least one energy storage device and the load bus. The system further includes a control system configured to control the at least one variable speed generator system, the at least one fixed speed generator and the SSG system responsive to changes in a load on the load bus.

In some embodiments, the control system may be configured to selectively activate and deactivate ones of the at least one fixed speed generator system and operate the variable speed generator system to maintain the load and to transiently operate the SSG system to maintain a voltage and/or a frequency of the load bus. The control system may be configured, for example, to activate at least one of the at least one fixed speed generator in response to an increase in the load and to operate the SSG system to temporarily serve the increased load until the activated at least one fixed speed generator assumes the increased load.

In some embodiments, the at least one variable speed generator system may be directly coupled to the load bus. In further embodiments, the at least one variable speed generator system may be coupled to the load bus via the SSG system.

According to some aspects, the control circuit may be configured to intermittently deactivate the at least one variable speed generator system and the at least one fixed speed generator and use the SSG system to maintain the load. The control circuit may be configured to charge the at least one energy storage device from the at least one fixed speed generator and/or the at least one variable speed generator system.

In some embodiments, the at least one fixed speed generator may include a plurality of fixed speed generator systems. The control circuit may be configured to selectively activate ones of the fixed speed generator systems responsive to changes in the load on the load bus. The control circuit may be configured to selectively activate one of the plurality of fixed speed generator systems or adjust an output of the at least one variable speed generator system responsive to changes in the load on the load bus. The at least one variable speed generator system may have a fraction of the capacity of each of the plurality of fixed speed generator systems.

Some method embodiments include coupling at least one variable speed generator system, at least one fixed speed generator system, and a solid state generator (SSG) system to a load bus. The SSG system includes at least one energy storage device and a converter having a first port coupled to the at least one energy storage device and a second port coupled to the load bus. The methods further include selectively transferring power from the at least one variable speed generator system, the at least one fixed speed generator system and the SSG system responsive to changes in a load on the load bus.

Still further embodiments provide a system including a solid state generator (SSG) system including at least one energy storage device and a converter having a first port coupled to the at least one energy storage device and a second port coupled to a load bus. The system further includes a variable speed generator system coupled to the first port of the converter. The converter of the SSG system may include a DC/AC converter and the variable speed generator system may include a generator and an AC/DC converter having an output coupled to the generator and an output coupled to an input of the DC/AC converter of the SSG system. The system may further include a control system configured to operate the variable speed generator system to maintain the load and to transiently operate the SSG system to maintain a voltage and/or a frequency of the load bus.

In further embodiments, the system may further include at least one fixed speed generator system coupled to the load bus. The system may include a control system configured to selectively activate and deactivate the at least one fixed speed generator system and operate the variable speed generator system to maintain the load and to transiently operate the SSG system to maintain a voltage and/or a frequency of the load bus.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
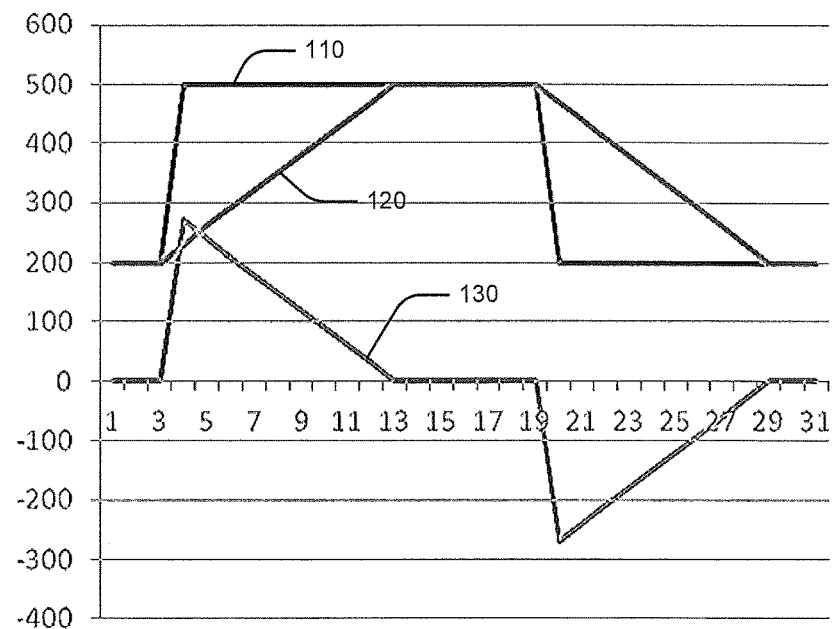
FIG. 1 illustrates operations of a solid state generator (SSG) system with respect to step load changes according to some embodiments.

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Throughout the specification, like reference numerals in the drawings denote like elements. The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

According to some embodiments, a Solid State Generator (SSG) offers a solution that supplies a load transient required by a load, allowing the generator respond to a lower rate of load application that will maintain the load voltage and frequency within specifications. This time shifting of the load step may use a form of energy store, such as capacitors and/or electrochemical storage. This can reduce operating costs and improve system dynamic performance.

FIG. 1 is a graph that shows how an SSG can provide the initial transient needs for a load. The figure illustrates the power interaction between the load 110, generator 120 and the SSG 130 for a load step on and off. The SSG controls slowly ramp down the power demand from the generator so that the generator will see a gradual loading and the voltage and frequency may remain within specification.

Figure 2:
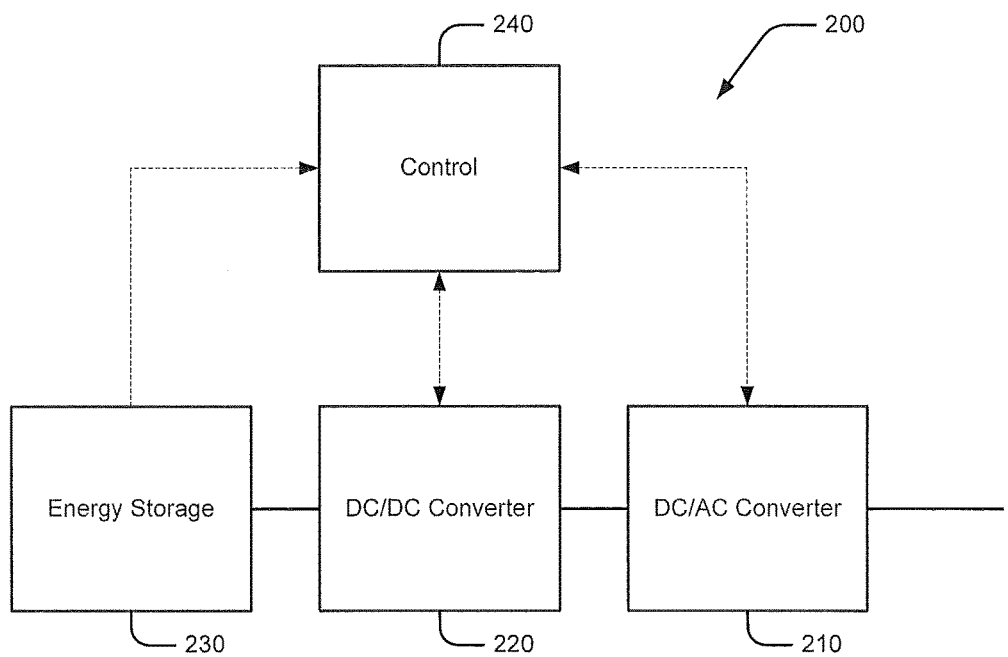
FIG. 2 is a schematic diagram of an SSG system according to some embodiments.

FIG. 2 shows a block diagram of an SSG system 200 according to some embodiments. A DC/AC converter 210 is connected between a DC bus and a 3-phase AC bus that supports a load. The 3-phase converter may have 5 terminals; positive, negative and 3 AC phase legs. The DC bus is connected to the positive and negative terminals and the DC/AC converter 210 may include 3 legs coupled to respective phases of the AC load bus through an inductor. The DC/AC converter 210 may be capable of using the DC bus and producing 3-phase AC voltages to support the load and it can transfer power from the AC bus to the DC bus. The 3-phase converter can look like a source or load depending on how the legs are controlled. A DC/DC converter 220 couples one or more energy storage devices 230 to the DC bus and can be individual DC to DC converters for each energy storage device. Each converter can transfer power to and from the DC bus as required. Alternately, the converter can be a 3-phase converter described above but the individual legs are coupled to the energy store using inductors as described in United States Provisional Patent Application Ser. No. 61/771,403 entitled "*Hybrid Energy Storage System and Methods*", filed Mar. 1, 2013 and U.S. patent application Ser. No. 14/190,398 entitled "*Hybrid Energy Storage System and Methods*" filed Feb. 26, 2014, the disclosures of each of which are incorporated herein by reference in their entirety. A control circuit 240 controls the DC/DC converter 220 and the DC/AC converter 210 and, as shown, may also monitor and/or control the one or more energy storage devices 230.

In some applications, peak load may exceed generator capacity by a small fraction of total generator capacity. In these applications, conventional solutions may add one or more generators of the same size. If the load is remains small with respect to a single generator, there may be a need to add a resistive load to meet minimum generator load requirements. Under these conditions, it is advantageous to provide a smaller generator increment but it is more problematic to parallel with the other generators.

According to some embodiments, a Variable Speed Generator (VSG) system may resolve these problems. A VSG system may use an engine whose speed is varied but produces a fixed DC voltage or a fixed frequency 3-phase waveform (e.g., using a DC to AC converter) over the speed range of the generator engine. In some embodiments, a VSG may used in at least two ways: (1) using a regulated DC voltage produced by a VSG as an input to a SSG and (2) coupling an SSG to the load bus along with a VSG.

Figure 3:
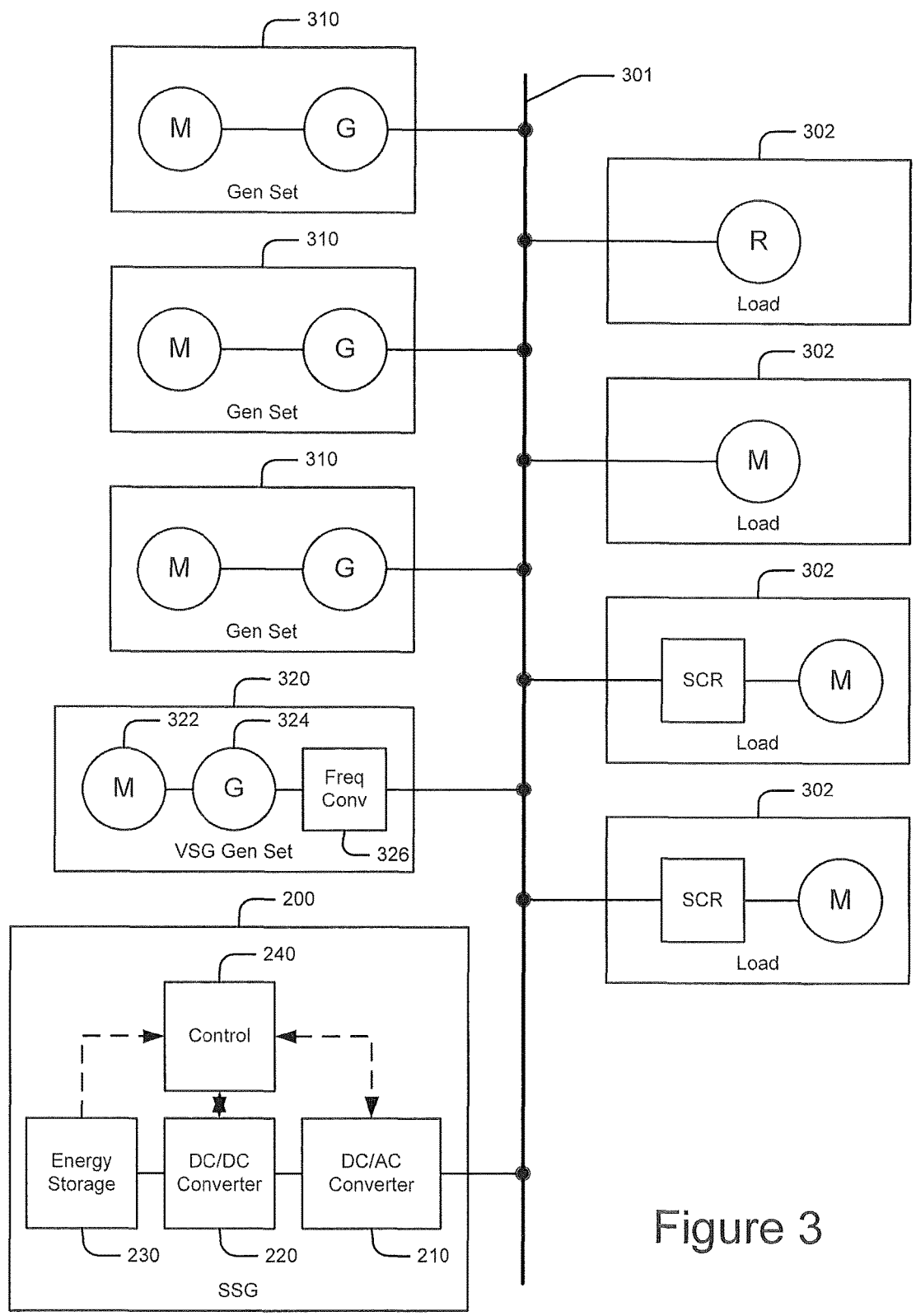
FIG. 3 is a schematic diagram illustrating a power system including plural fixed speed generator systems, a variable speed generator system and an SSG system according to some embodiments.

FIG. 3 illustrates a configuration in which an SSG system 200 is coupled to an AC load bus 301 having various loads 302 coupled thereto and that is served by one or more fixed speed generator sets 310 and also served by a VSG generator set 320. As shown, the VSG generator set 320 includes a motor 322 (e.g., a diesel or natural gas engine), a generator 324 and a frequency converter 326. The characteristic of the VSG generator set 320 is that the generator 324 does not need to rotate at a specific speed to produce an output with a fixed frequency, as the frequency converter 320 may maintain the desired frequency.

Fuel savings may be achieved by operating the generator 324 at lower speeds at lighter loads and higher speeds for greater loads.

Figure 4:
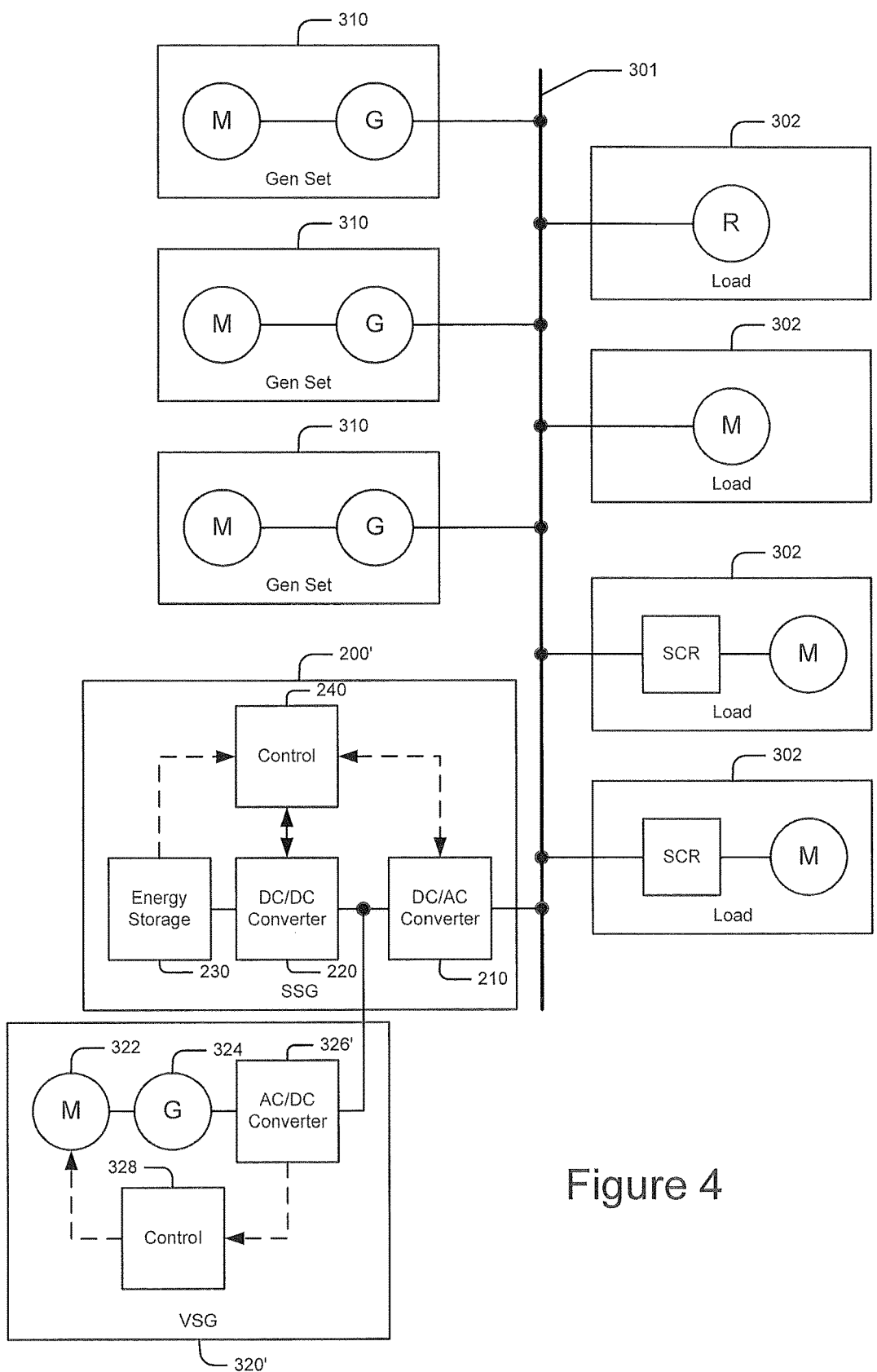
FIG. 4 is a schematic diagram illustrating a power system including plural fixed speed generator systems and a variable speed generator system interfaced to a load bus via an SSG system according to further embodiments.

FIG. 4 illustrates another configuration in which a VSG set is integrated in a combined VSG+SSG system. This implementation uses a VSG system 320' that has an AC/DC converter 326' coupled to a generator 324 and that produces a regulated DC output. This DC output is coupled to the DC bus of an SSG system 200' having a DC/AC converter 210 that is coupled to a load bus 301. This transfers power produced by the generator 324 to the bus 301 to support the load. In this implementation, the SSG system 200' uses a DC/DC converter 220 to couple energy storage 230 to the shared DC bus. This configuration can time shift a load step so the rate of loading or unloading of the generators is maintained at a level to keep the voltage and frequency of the load bus in specification.

This approach combines the variable speed generator and the SSG function by connecting the variable speed generator DC output to the DC bus. This allows for a reduced number of components and may provide better control of system performance. The SSG system 200' may use a DC/DC converter to supply the DC bus from a capacitor and/or electrochemical store. A control system may, for example, monitor the number of generators available, how many are online and the percent loading for each.

When the VSG system 320' is active, the variable speed generator controls can respond based on the voltage of the DC bus. For example, when the DC bus voltage exceeds a first level for some period of time (e.g., 30 seconds), the variable speed generator may be turned off but the control system may continue to monitor the DC bus voltage. When the DC voltage falls below the first level for some period of time (e.g., 30 seconds), the variable speed generator may be started and warmed up. After a brief warm up interval, the variable speed generator rectifier may be operated to maintain the DC bus at a second level which is lower than the first level. The variable speed generator controls may limit the power supplied by the variable speed generator to a maximum value even if the DC voltage cannot be maintained by the variable speed generator. There also may be a protection level that is much lower than the first and second levels where the generator controls disconnect the variable speed generator from the DC bus. At a third voltage level that is below the first and second levels, the electrochemical storage may be used to support the DC bus voltage. This third voltage level is higher than the protection level but lower than the second voltage level. Operation at this voltage level may allow the variable generator and the electrochemical energy stores to concurrently provide power to the load.

This arrangement of voltage levels enables selection of the sources that will be used to support the load. Another feature of the system is that the converters (except the variable speed generator rectifier) may be capable of supplying and receiving power. This type of converter allows current flow into and out of each energy store. The same converters that discharge the energy store can recharge it by reversing the current.

The power supplied by the various sources may be controlled by the droop of the DC bus voltage between the first level and the third level. For example, if the DC bus voltage falls to the second level, the variable speed generator may supply a minimum amount of power to the DC bus. As the DC bus voltage continues to fall, the generator may supply increasing amounts of power until the DC bus voltage has fallen to the third level. At the third voltage level, the variable speed generator may be supplying maximum power to the DC bus. The generator controls may limit the current and/or power supplied to prevent damage to the variable speed generator. At this third level, the variable speed generator is supplying maximum power and the two types of energy stores may also be supplying power to the load and/or recharging independently.

Since the generator and energy stores can be controlled and supply load requirements independently, the SSG and VSG elements can be sized individually to meet the load requirements. The SSG element may be sized based on the total generator capacity and the maximum step load that will be experienced. The VSG element may be sized to support loads that are a fraction of the main generator size. This method of system sizing offers the ability to support very large load steps and turn off the large generators during prolonged light load conditions. This can provide significant cost savings along with reduction in emissions and fuel consumption.

Figure 5A:
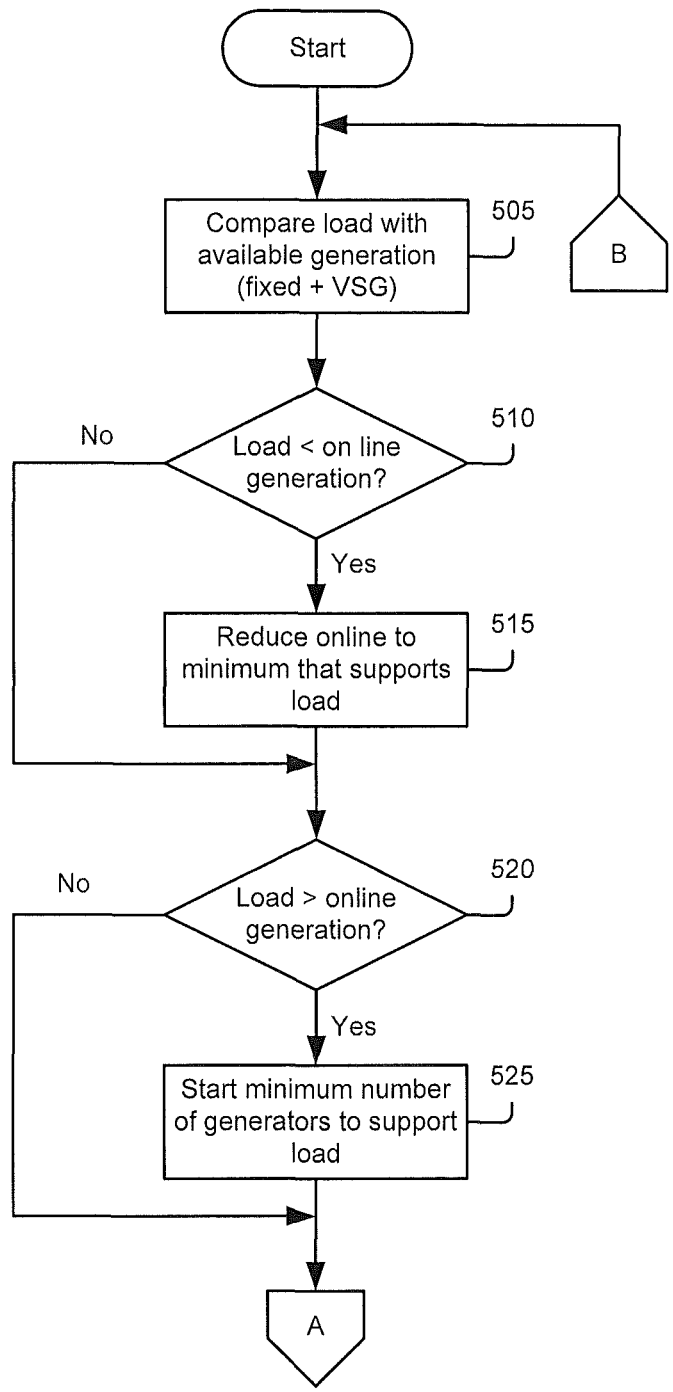
FIGS. 5A-B are a flowchart illustrating operations of a power system according to some embodiments.
Figure 5B:
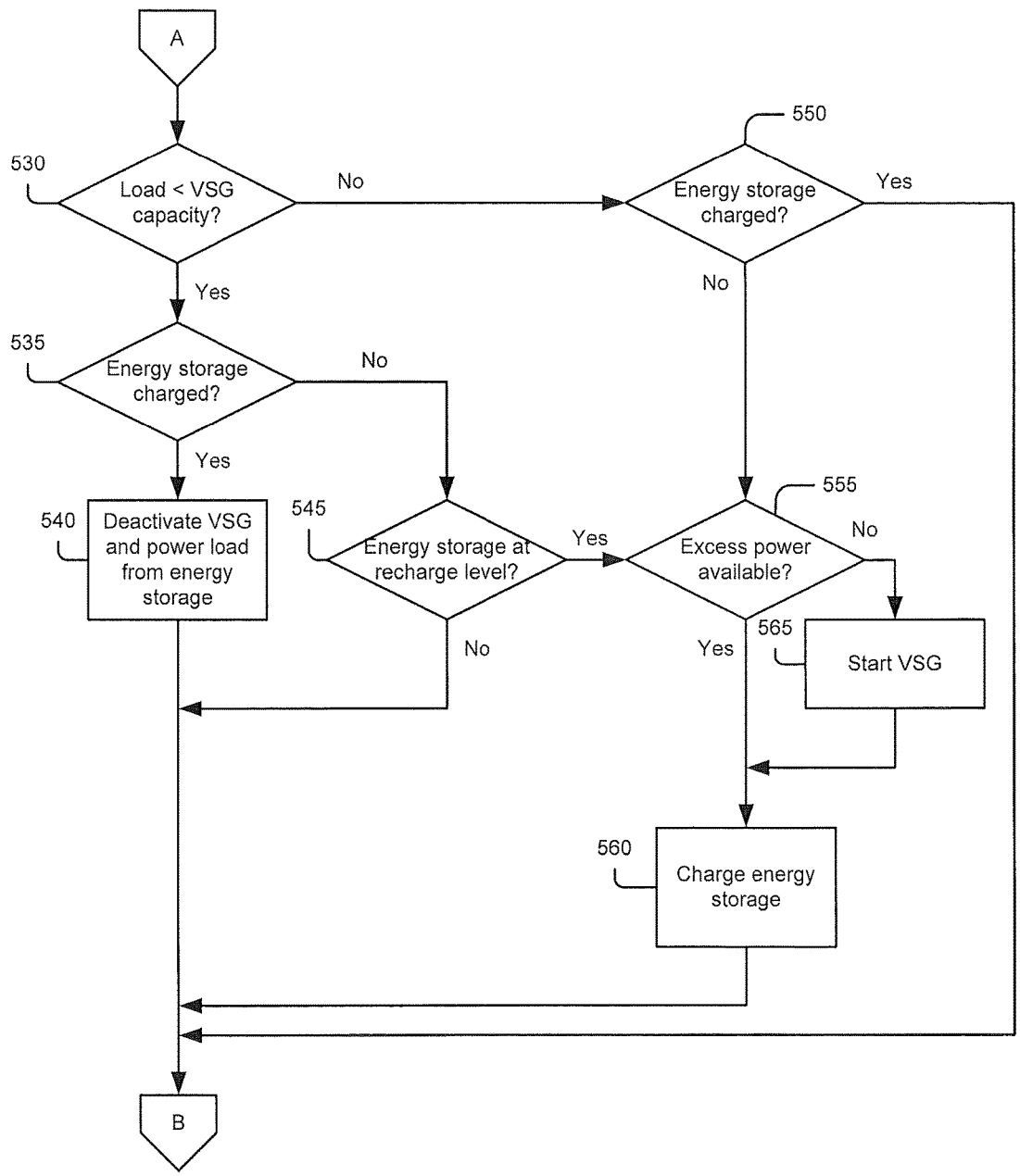

In various embodiments, fixed speed generators, VSG and energy storage can be allocated based on load demand as shown in FIGS. 5A and 5B. Referring to FIG. 5A, a load on the load bus may be compared with available generation capacity (block 505). If the load is less than the amount of capacity currently on line, the amount of on-line capacity may be reduced to a level that supports the current load (blocks 510, 515). If the load increases above the online capacity, a minimum number of generators may be started to support the load (blocks 520, 525).

Referring to FIG. 5B, if the load is greater than the capacity of the VSG system and the energy storage is sufficiently charged, the system continues operation using the currently online generation (blocks 540 and 550). If the load is less than the capacity of the VSG system and the energy storage is sufficiently charged, the VSG may be deactivated and the load powered from the energy storage (blocks 530, 535 and 540). If the energy storage is not sufficiently charged, but is still charged to a level above a recharge threshold, the VSG may continue to serve the load (blocks 535 and 540). If the energy storage charge level is sufficiently low, the VSG is off-line and excess power is available from non-VSG online generation, the energy storage devices may be charged (blocks 545, 555 and 560). If excess power is not available, the VSG may be started and used to charge the energy storage (blocks 565, 560).

In a first scenario, the load is light and can be supported by the variable speed generator. The control system may send a signal to the other generators on the load bus to turn off. The variable speed generator may supply the load bus and the load transients are supplied by the energy storage devices (e.g., capacitors) using the SSG function. If the load is lighter than the variable speed generator, the variable speed generator can be operated in an on/off mode where the electrochemical storage supplies the power during the off intervals and the generator supplies the load and recharges the battery during the on intervals. This operating mode allows the variable speed generator to operate at higher efficiency. This operating mode may offer the highest efficiency because the fixed speed generators are off and the variable speed generator is operated at maximum efficiency.

In a second scenario, the load is increased beyond the capabilities of the variable speed generator. The control system may send a command to start sufficient additional generators to support the applied load. The SSG function may use the capacitor and/or the electrochemical stores to supply the load until the generators are started and assume the load. After the generators are supplying the load bus, the SSG energy stores may be recharged by the excess capacity of the generators. The variable speed generator may be turned off if sufficient generator capacity is available. The SSG may control load transients by time shifting the transient to maintain a rate of change in generator loading to keep the voltage and frequency change within specifications. Again, in this operating mode, the generator availability may be configured to meet to the load requirements and offer desirable system efficiency and emissions.

In a third scenario, the load increases beyond the capabilities of the variable speed generator alone. As in the second scenario, the control system may send a command to start sufficient additional generators to support the load. The variable speed generator may be sized to be a fraction of the capacity of the other generators and the control system can use the variable speed generator to supply the load with the other generators to support the load without starting one of the other generators. The SSG may control load transients by time shifting the transients to maintain a rate of change in generator loading to keep the voltage and frequency change within specifications. This may improve system efficiency by maximizing main generator loading and making best use of the available sources.

In fourth scenario, the load is increased beyond the capabilities of the variable speed generator alone. As in the second and third scenarios, the control system may send a command to start sufficient additional generators to support the load. If the load is higher than all the available sources, the VSG system can use all the energy stores to support this overload. Since the overload cannot be supported indefinitely, the control system may activate an alarm to notify the operator of an unsustainable condition.

In all of the above described scenarios, the control system may monitor the load and individual generator loading. The control system may power down excess generation capacity to provide a minimum generator loading and desired efficiency under varying load conditions. A system combining the SSG+VSG function enables a single converter to provide the time shifting of load demands under any combination of VSG and main generator operating modes.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

That which is claimed:

1. A system comprising:
   at least one variable speed generator system comprising a generator driven by an engine and configured to provide power to a load bus;
   at least one fixed speed generator system comprising a generator driven by an engine and configured to provide power to the load bus;
   a solid state generator (SSG) system comprising at least one energy storage device and a converter coupled to the at least one energy storage device and configured to transfer power between the at least one energy storage device and the load bus; and
   a control system configured to control the at least one variable speed generator system, the at least one fixed speed generator system and the SSG system responsive to changes in a load on the load bus.

2. The system of claim 1, wherein the control system is configured to selectively activate and deactivate ones of the at least one fixed speed generator system and operate the variable speed generator system to maintain the load and to transiently operate the SSG system to maintain a voltage and/or a frequency of the load bus.

3. The system of claim 2, wherein the control system is configured to activate at least one of the at least one fixed speed generator system in response to an increase in the load and to operate the SSG system to temporarily serve the increased load until the activated at least one of the at least one fixed speed generator system assumes the increased load.

4. The system of claim 1, wherein the at least one variable speed generator system is coupled to the load bus via the SSG system.

5. The system of claim 1, wherein the control system is configured to intermittently deactivate ones of the at least one variable speed generator system and the at least one fixed speed generator system responsive to changes in the load.

6. The system of claim 1, wherein the control system is configured to charge the at least one energy storage device from the at least one fixed speed generator system and/or the at least one variable speed generator system.

7. The system of claim 1, wherein the at least one fixed speed generator system comprises a plurality of fixed speed generator systems, and wherein the control system is configured to selectively activate ones of the plurality of fixed speed generator systems responsive to changes in the load on the load bus.

8. The system of claim 1, wherein the control system is configured to selectively activate one of the at least one fixed speed generator system or adjust an output of the at least one variable speed generator system responsive to changes in the load on the load bus.

9. The system of claim 8, wherein the at least one variable speed generator system has a fraction of the capacity of the one of the at least one fixed speed generator system.

10. A method comprising:
coupling at least one variable speed generator system comprising a generator driven by an engine, at least one fixed speed generator system comprising a generator driven by an engine, and a solid state generator (SSG) system to a load bus, the SSG system comprising at least one energy storage device and a converter having a first port coupled to the at least one energy storage device and a second port coupled to the load bus; and
selectively activating and deactivating the at least one fixed speed generator system and operating the at least one variable speed generator system and the SSG system responsive to changes in a load on the load bus.

11. The method of claim 10, wherein selectively activating and deactivating the at least one fixed speed generator system and operating the at least one variable speed generator system and the SSG system responsive to changes in a load on the load bus comprises:
selectively activating and deactivating the at least one fixed speed generator system and operating the variable speed generator system to maintain the load; and
transiently operating the SSG system to maintain a voltage and/or a frequency of the load bus.

12. The method of claim 11, wherein selectively activating and deactivating the at least one fixed speed generator system and operating the at least one variable speed generator system and the SSG system responsive to changes in a load on the load bus comprises:
activating at least one of the at least one fixed speed generator system in response to an increase in the load; and
operating the SSG system to temporarily serve the increased load until the activated at least one of the at least one fixed speed generator system assumes the increased load.

13. The method of claim 10, wherein the at least one variable speed generator system is coupled to the load bus via the SSG system.

14. The method of claim 10, wherein selectively activating and deactivating the at least one fixed speed generator system and operating the at least one variable speed generator system and the SSG system responsive to changes in a load on the load bus comprises intermittently deactivating the at least one variable speed generator system and/or the at least one fixed speed generator system to power the load from the at least one energy storage device.

15. The method of claim 10, further comprising charging the at least one energy storage device from the at least one fixed speed generator system and/or the at least one variable speed generator system.

16. The method of claim 10, wherein the at least one fixed speed generator system comprises a plurality of fixed speed generators, and wherein selectively activating and deactivating the at least one fixed speed generator system and operating the at least one variable speed generator system and the SSG system responsive to changes in a load on the load bus comprises selectively activating ones of the plurality of fixed speed generator systems responsive to changes in the load on the load bus.

17. The method of claim 10, wherein selectively activating and deactivating the at least one fixed speed generator system and operating the at least one variable speed generator system and the SSG system responsive to changes in a load on the load bus comprises selectively activating one of the at least one fixed speed generator system or adjusting an output of the at least one variable speed generator system responsive to changes in the load on the load bus.

18. The method of claim 17, wherein the at least one variable speed generator system has a fraction of the capacity of the one of the at least one fixed speed generator system.

19. A system comprising:
a solid state generator (SSG) system comprising at least one energy storage device and a converter having a first port coupled to the at least one energy storage device and a second port coupled to a load bus;
a variable speed generator system comprising a generator driven by an engine and coupled to the first port of the converter;
at least one fixed speed generator system comprising a generator driven by an engine and coupled to the load bus; and
a control system configured to selectively activate and deactivate the at least one fixed speed generator system and operate the variable speed generator system to maintain the load and to transiently operate the SSG system to maintain a voltage and/or a frequency of the load bus.

20. The system of claim 19, wherein the converter of the SSG system comprises a DC/AC converter and wherein the variable speed generator system comprises:
a generator; and
an AC/DC converter having an output coupled to the generator and an output coupled to an input of the DC/AC converter of the SSG system.

21. The system of claim 1, wherein the at least one variable speed generator system is directly coupled to the load bus.

22. The method of claim 10, wherein the at least one variable speed generator system is directly coupled to the load bus.

* * * * *